United States Patent
Feng

(10) Patent No.: US 12,461,850 B2
(45) Date of Patent: Nov. 4, 2025

(54) MEMORY AND OPERATION METHOD THEREOF, AND MEMORY SYSTEM TO READ FROM A SELECTED PLANE

(71) Applicant: YANGTZE MEMORY TECHNOLOGIES CO., LTD., Wuhan (CN)

(72) Inventor: Yufei Feng, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 62 days.

(21) Appl. No.: 18/219,635

(22) Filed: Jul. 7, 2023

(65) Prior Publication Data

US 2024/0345948 A1 Oct. 17, 2024

(30) Foreign Application Priority Data

Apr. 11, 2023 (CN) .......................... 202310384348.4

(51) Int. Cl.
*G06F 12/02* (2006.01)
*G06F 12/0882* (2016.01)
*G06F 13/16* (2006.01)

(52) U.S. Cl.
CPC ...... *G06F 12/0246* (2013.01); *G06F 12/0882* (2013.01); *G06F 13/1668* (2013.01)

(58) Field of Classification Search
CPC ............ G06F 12/0246; G06F 12/1668; G06F 12/0882
See application file for complete search history.

(56) References Cited

U.S. PATENT DOCUMENTS

| | | | |
|---|---|---|---|
| 2022/0179568 A1* | 6/2022 | Shah .................. | G11C 16/0483 |
| 2022/0383916 A1* | 12/2022 | Park ..................... | G11C 7/1063 |
| 2024/0086107 A1* | 3/2024 | Nayak .................. | G06F 3/0679 |
| 2024/0086317 A1* | 3/2024 | Fu ....................... | G06F 12/0882 |

* cited by examiner

*Primary Examiner* — Mark A Giardino, Jr.
(74) *Attorney, Agent, or Firm* — BAYES PLLC

(57) ABSTRACT

The present disclosure provides a memory and an operation method thereof, and a memory system. The memory may include a memory cell array and a peripheral circuit coupled to the memory cell array. The memory cell array may include a plurality of memory planes. Each of the memory planes may include a plurality of memory pages. The peripheral circuit may be configured to, during performing a read operation in an async multi-plane independent read mode, read a first memory page, and update address information to address information of a memory page next to the first memory page after the read operation on the first memory page. The first memory page may be a first memory page to be read in a currently selected memory plane. The peripheral circuit may be configured to perform sequential cache read on the currently selected memory plane according to the updated address information.

20 Claims, 7 Drawing Sheets

During performing a read operation in an async multi-plane independent read mode, read a first memory page, and update address information to address information of a memory page next to the first memory page after the read operation on the first memory page is completed, wherein the first memory page being a first memory page to be read in a currently selected memory plane — S701

Perform sequential cache read on the currently selected memory plane according to the updated address information — S702

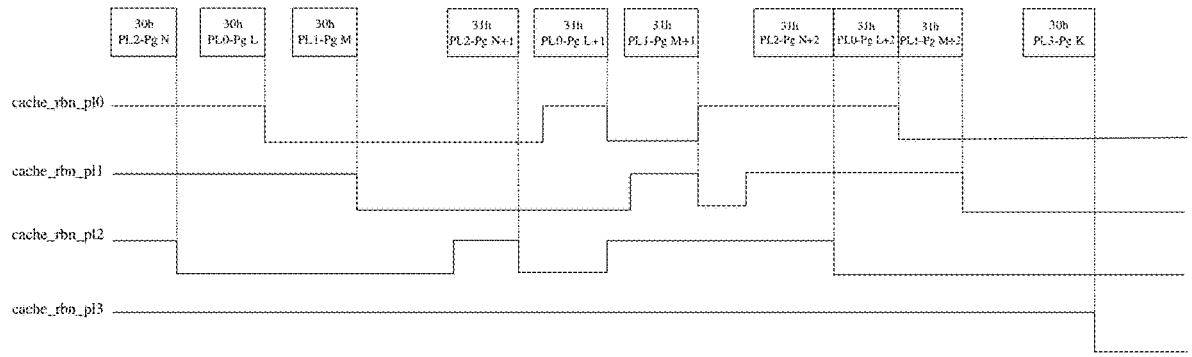

Fig. 6a

```
<CMD: 77h> (poll cache ready) <CMD: 00h> <ADDR: Plane2/PageN>   <CMD: 30h> tR
<CMD: 77h> (poll cache ready) <CMD: 00h> <ADDR: Plane0/PageL>   <CMD: 30h> tR
<CMD: 77h> (poll cache ready) <CMD: 00h> <ADDR: Plane1/PageM>   <CMD: 30h> tR
<CMD: 77h> (poll cache ready) <CMD: 00h> <ADDR: Plane2/PageN+1> <CMD: 31h> tR
<CMD: 77h> (poll cache ready) <CMD: 00h> <ADDR: Plane0/PageL+1> <CMD: 31h> tR
<CMD: 77h> (poll cache ready) <CMD: 00h> <ADDR: Plane1/PageM+1> <CMD: 31h> tR
<CMD: 77h> (poll cache ready) <CMD: 00h> <ADDR: Plane2/PageN+2> <CMD: 31h> tR
<CMD: 77h> (poll cache ready) <CMD: 00h> <ADDR: Plane0/PageL+2> <CMD: 31h> tR
<CMD: 77h> (poll cache ready) <CMD: 00h> <ADDR: Plane1/PageM+2> <CMD: 31h> tR
<CMD: 77h> (poll cache ready) <CMD: 00h> <ADDR: Plane3/PageK>   <CMD: 30h> tR
```

Fig. 6b

```
<CMD: 77h>  (poll cache ready)  <CMD: 00h> <ADDR: Plane0/PageN> <CMD: 30h> tR
<CMD: 77h>  (poll cache ready)  <CMD: 00h> <ADDR: Plane1/PageL> <CMD: 30h> tR
<CMD: 77h>  (poll cache ready)  <CMD: 00h> <ADDR: Plane2/PageM> <CMD: 30h> tR
<CMD: 77h>  (poll cache ready)  <CMD: 31h> tR
<CMD: 77h>  (poll cache ready)  <CMD: 31h> tR
<CMD: 77h>  (poll cache ready)  <CMD: 31h> tR
<CMD: 77h>  (poll cache ready)  <CMD: 31h> tR
<CMD: 77h>  (poll cache ready)  <CMD: 31h> tR
<CMD: 77h>  (poll cache ready)  <CMD: 31h> tR
<CMD: 77h>  (poll cache ready)  <CMD: 00h> <ADDR: Plane3/PageK> <CMD: 30h> tR
```

Fig. 8b

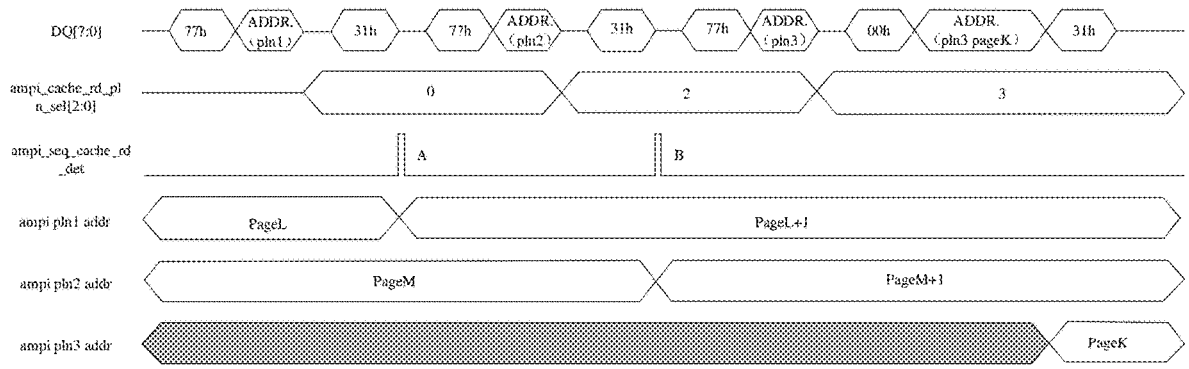

Fig. 9

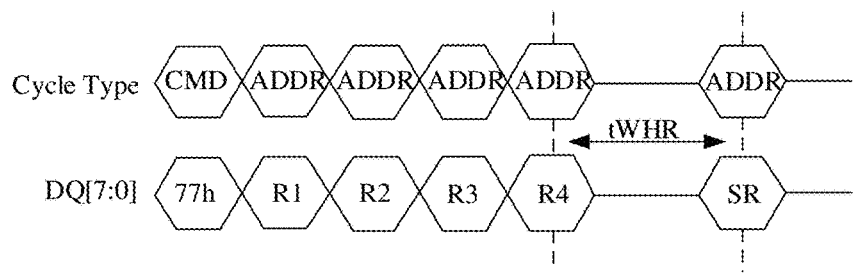

Fig. 10

MEMORY AND OPERATION METHOD THEREOF, AND MEMORY SYSTEM TO READ FROM A SELECTED PLANE

CROSS-REFERENCE TO RELATED APPLICATIONS

The present application claims the benefit of priority to Chinese Patent Application No. 202310384348.4, filed on Apr. 11, 2023, which is hereby incorporated by reference in its entirety.

TECHNICAL FIELD

Implementations of the present disclosure relate to the field of semiconductor technology, and in particular, to a memory and an operation method thereof, and a memory system.

BACKGROUND

Memory is a memory device used to save information in modern information technology. As a typical non-volatile semiconductor memory, NAND (Not-And) type memory has become a mainstream product in the market due to its high storage density, controllable production cost, suitable programming and erasing speed and retention characteristics.

However, with people's increasing use of memory, there are still many problems with memory and its systems in performing read and write operations.

SUMMARY

Based on this, on the one hand, an implementation of the present disclosure proposes a memory. The memory may include a memory cell array and a peripheral circuit coupled to the memory cell array. The memory cell array may include a plurality of memory planes, and each of the memory planes comprises a plurality of memory pages. The peripheral circuit may be configured to, during performing a read operation in an async multi-plane independent read mode, read a first memory page, and update address information to address information of a memory page next to the first memory page after the read operation on the first memory page is completed, wherein the first memory page being a first memory page to be read in a currently selected memory plane. The peripheral circuit may be configured to perform sequential cache read on the currently selected memory plane according to the updated address information.

In some implementations, the peripheral circuit may be further configured to receive a first instruction before performing the read operation. In response to the first instruction, the peripheral circuit may be further configured to perform a read operation on a plurality of the currently selected memory planes in the async multi-plane independent read operation mode. In some implementations, the peripheral circuit may be further configured to receive a second instruction; in response to the second instruction, perform a read operation on the first memory page of each of the plurality of memory planes, and update the address information to the address information of the memory page next to the first memory page after completing the read operation on the first memory page. In some implementations, the peripheral circuit may be further configured to receive a third instruction; in response to the third instruction, perform the sequential cache read on the plurality of the currently selected memory planes according to the updated address information.

In some implementations, the peripheral circuit is further configured to receive a fourth instruction after receiving the first instruction and before receiving the second instruction and after receiving the second instruction and before receiving the third instruction. In some implementations, the fourth instruction may include address information of the currently selected memory plane. In response to the fourth instruction, the peripheral circuit may be configured to determine the address information of the currently selected memory plane among the plurality of memory planes.

In some implementations, the peripheral circuit may further include a first register. The peripheral circuit may be configured to store the address information of the currently selected memory plane comprised in the fourth instruction in the first register. The peripheral circuit may be configured to determine the address information of the currently selected memory plane from the first register.

In some implementations, the peripheral circuit further includes a plurality of second registers. The peripheral circuit may be configured to receive a fifth instruction after receiving the fourth instruction and before receiving the second instruction, wherein the fifth instruction comprising at least address information of the first memory page in the plurality of memory planes on which the async multi-plane independent read operation is performed. In some implementations, the peripheral circuit may be further configured to store address information of a first memory page to be read of each of the plurality of memory planes on which the async multi-plane independent read is performed in the plurality of second registers respectively. In response to the fifth instruction, the peripheral circuit may be configured to determine the address information of the first memory page.

In some implementations, the peripheral circuit may be further configured to receive the third instruction after determining the currently selected memory plane, and trigger a first signal in response to the third instruction, wherein the first signal indicating that the address information in the second register corresponding to the currently selected memory plane is to be updated to the address information of the memory page next to the first memory page.

In some implementations, the first register may include a plurality of valid data bits. In some implementations, the number of the plurality of memory planes read in the async multi-plane independent read operation mode may be less than or equal to 2N if the number of valid data bits is N.

In some implementations, the peripheral circuit may further include a third register. When a value stored in the third register is a first value, the peripheral circuit may be configured to respond to the first instruction, the second instruction, and the third instruction. When the value stored in the third register is a second value, the peripheral circuit may be configured to not respond to the first instruction, the second instruction, and the third instruction.

In some implementations, the memory comprises a NAND type memory.

On the other hand, an implementation of the present disclosure provides a memory system. The memory system may include one or more memories as described in the above solution of the present disclosure. The memory system may include a memory controller coupled to the memories and configured to control the memories.

In some implementations, the memory system comprises a solid-state drive.

In some aspects, an implementation of the present disclosure provides a method of operating a memory. The memory may include a memory cell array and a peripheral circuit coupled to the memory cell array. The memory cell array may include a plurality of memory planes, and each of the memory planes comprises a plurality of memory pages.

In some implementations, during performing a read operation in an async multi-plane independent read mode, the method may include reading a first memory page, and updating address information to address information of a memory page next to the first memory page after the read operation on the first memory page is completed. In some implementations, the first memory page may be a first memory page to be read in a currently selected memory plane.

In some implementations, the method may include performing sequential cache read on the currently selected memory plane according to the updated address information.

In some implementations, the performing the read operation in the async multi-plane independent read mode may include receiving a first instruction; in response to the first instruction, performing a read operation on a plurality of the currently selected memory planes in the async multi-plane independent read operation mode.

In some implementations, the reading the first memory page, and updating the address information to the address information of the memory page next to the first memory page after the read operation on the first memory page is completed may include receiving a second instruction; in response to the second instruction, performing a read operation on the first memory page of each of the plurality of memory planes, and updating the address information to the address information of the memory page next to the first memory page after completing the read operation on the first memory page.

In some implementations, the performing the sequential cache read on the currently selected memory plane according to the updated address information includes receiving a third instruction. In response to the third instruction, the sequential cache read on the plurality of the currently selected memory planes may be performed according to the updated address information.

In some implementations, the method may further include receiving a fourth instruction after receiving the first instruction and before receiving the second instruction and after receiving the second instruction and before receiving the third instruction, wherein the fourth instruction comprising address information of the currently selected memory plane.

In some implementations, in response to the fourth instruction, the method may further include determining the address information of the currently selected memory plane among the plurality of memory planes.

In some implementations, the method may further include storing the address information of the currently selected memory plane comprised in the fourth instruction in the first register. In some implementations, the method may further include determining the address information of the currently selected memory plane from the first register.

In some implementations, the method further includes include receiving a fifth instruction after receiving the fourth instruction and before receiving the second instruction, wherein the fifth instruction comprising at least address information of the first memory page in the plurality of memory planes on which the async multi-plane independent read operation is performed. In some implementations, the method further includes storing address information of a first memory page to be read of each of the plurality of memory planes on which the async multi-plane independent read is performed in the plurality of second registers respectively. In response to the fifth instruction, the method may include determining the address information of the first memory page.

In some implementations, updating the address information to the address information of the memory page next to the first memory page after completing the read operation on the first memory page may include receiving the third instruction after determining the currently selected memory plane, and triggering a first signal in response to the third instruction. The first signal may indicate that the address information in the second register corresponding to the currently selected memory plane is to be updated to the address information of the memory page next to the first memory page.

In some implementations, the first register includes a plurality of valid data bits. In some implementations, the number of the plurality of memory planes read in the async multi-plane independent read operation mode may be less than or equal to 2N if the number of valid data bits is N.

In some implementations, the method further includes obtaining a value stored in a third register after receiving the first instruction and the second instruction. In some implementations, when the value stored in the third register is a first value, the method may further include responding to the first instruction, the second instruction, and the third instruction. In some implementations, when the value stored in the third register is a second value, the method may include not responding to the first instruction, the second instruction, and the third instruction.

According to the implementations of the present disclosure, during performing a read operation in an async multi-plane independent read mode, the method may include reading a first memory page, and updating address information to address information of a memory page next to the first memory page after the read operation on the first memory page is completed. In some implementations, the first memory page may be a first memory page to be read in a currently selected memory plane. In some implementations, the sequential cache read on the currently selected memory plane may be performed according to the updated address information.

It should be understood that when the normal read and random cache read are performed in the async multi-plane independent read mode, the read instruction received by the memory includes an address command, and the memory can read all memory pages in multiple memory planes according to the received address command. However, when sequential cache read is performed in the async multi-plane independent read mode, the read command received by the memory may not include an address command. Based on this, the address information of the first memory page to be read may be updated to the address information of the page next to the first memory page to be read after performing the read operation on the first memory page to be read in the currently selected memory plane according to the implementations of the present disclosure. In so doing, the address information of multiple memory pages of each of the multiple memory planes may be updated sequentially, which solves the incompatibility between the async multi-plane independent read mode and sequential cache read, thereby improving the reading performance of the memory.

BRIEF DESCRIPTION OF THE DRAWINGS

FIG. 6a is a schematic diagram of level changes when a read operation is performed on a memory plane according to an implementation of the present disclosure;

FIG. 6b is a schematic diagram of an instruction sequence corresponding to FIG. 6a;

FIG. 8b is a schematic diagram of an instruction sequence corresponding to FIG. 8a;

FIG. 9 is a schematic diagram of partial timing when a read operation is performed on another multiple memory planes for performing an async multi-plane independent read operation according to an implementation of the present disclosure; and FIG. 10 is a schematic diagram of timing of a fourth instruction according to an implementation of the present disclosure.

DETAILED DESCRIPTION

Figure 1:
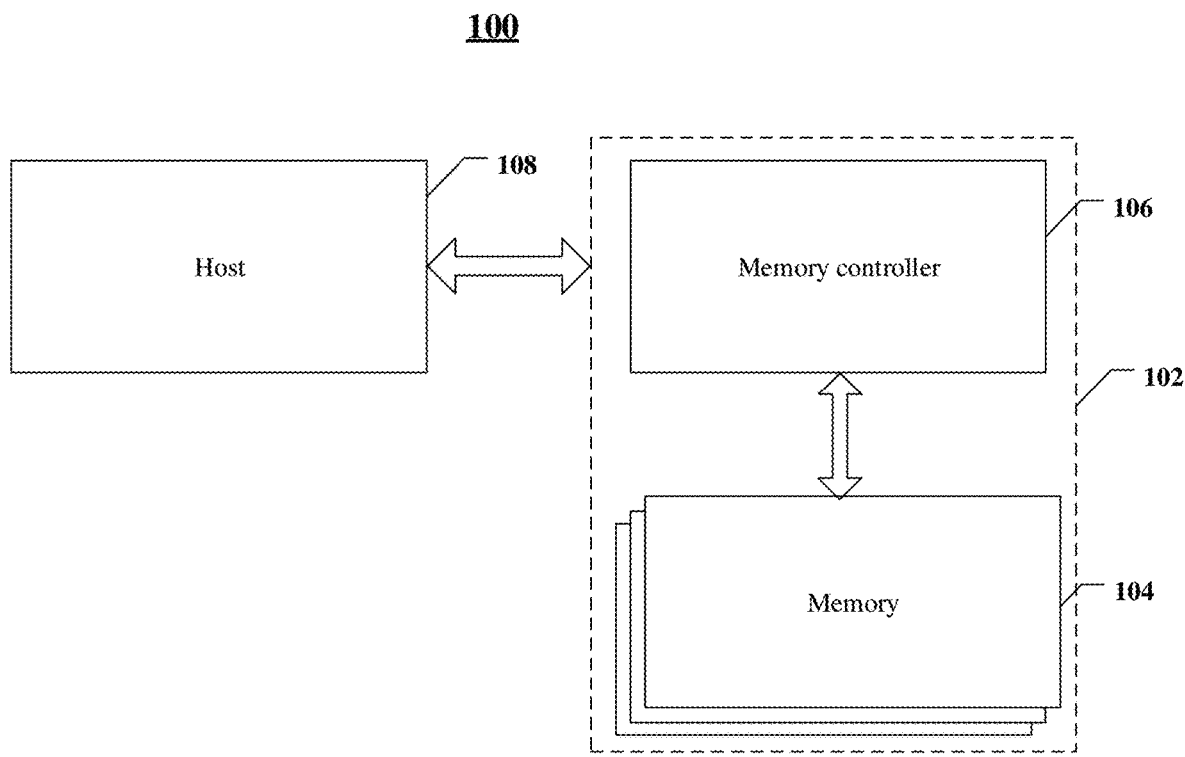
FIG. 1 is a schematic diagram of a system with a memory system according to an implementation of the present disclosure.

Implementations of the present disclosure will be described in more detail below with reference to the accompanying drawings. Although implementations of the present disclosure are shown in the drawings, it should be understood that the present disclosure may be implemented in various ways and should not be limited to the DETAILED DESCRIPTION set forth herein. Rather, these implementations are provided so that the present disclosure can be more thoroughly understood and the scope of the present disclosure can be fully conveyed to those skilled in the art.

In the following description, numerous specific details are given in order to provide a more thorough understanding of the present disclosure. It will be apparent, however, to one skilled in the art that the present disclosure may be practiced without one or more of these details. In other examples, some technical features in the art are not described to avoid confusion with the present disclosure; that is, not all features of the actual implementation are described here, and these functions and structures are not described in detail.

In the drawings, the size of layers, regions, elements and their relative sizes may be exaggerated for clarity. Like reference numerals refer to like elements throughout.

It will be understood that when an element or layer is referred to as being "on," "adjacent to," "connected to" or "coupled to" another element or layer, it can be directly on, adjacent to, connected to, or coupled to other elements or layers, or intervening elements or layers may be present. In contrast, when an element is referred to as being "directly on," "directly adjacent to," "directly connected to" or "directly coupled to" another element or layer, there are no intervening elements or layers. It will be understood that, although the terms such as first, second, third etc. may be used to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be represented as a second element, component, region, layer or section without departing from the teachings of the present disclosure. When a second element, component, region, layer or section is discussed, it does not indicate that a first element, component, region, layer or section necessarily exists in the present disclosure.

Spatial terms such as "under", "below", "beneath", "underneath", "on", "above" and so on, can be used here for convenience to describe the relationship between one element or feature and other elements or features shown in the figures. It will be understood that the spatially relationship terms also comprise different orientations of the device in use and operation in addition to the orientation depicted in the figures. For example, if the device in the figures is turned over, elements or features described as "below" or "underneath" or "under" other elements or features would then be oriented as "above" the other elements or features. Thus, the terms "below" and "under" can comprise both orientations of above and below. The device may be otherwise oriented (rotated 90 degrees or at other orientations) and the spatial descriptors used herein may be interpreted accordingly.

The terminology used herein is for the purpose of describing particular implementations only and is not to be taken as a limitation of the present disclosure. As used herein, "a", "an" and "said/the" in singular forms are intended to include the plural forms as well, unless the context clearly dictates otherwise. It should be also understood that the terms "consists of" and/or "comprising", when used in this specification, identify the presence of stated features, integers, steps, operations, elements and/or components, but do not exclude presence or addition of one or more other features, integers, steps, operations, elements, components and/or groups. As used herein, the term "and/or" includes any and all combinations of the associated listed items.

For ease of understanding the characteristics and technical content of the implementations of the present disclosure in more detail, the implementation of the implementations of the present disclosure will be described in detail below in conjunction with the accompanying drawings. The attached drawings are only for reference and description, and are not intended to limit the implementation of the present disclosure.

The memory in the implementations of the present disclosure includes but is not limited to a three-dimensional NAND type memory, and for ease of understanding, a three-dimensional NAND type memory is used as an example for illustration. In addition, the instructions or commands mentioned in each implementation of the present disclosure can be adapted to the ONFI protocol.

FIG. 1 illustrates a block diagram of a system 100 having memory, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and a memory system 102 having one or more memory 104 and a memory controller 106. Host 108 can be a processor of an electronic device, such as a central processing unit (CPU), or a system-on-chip (SoC), such as an application processor (AP). Host 108 can be configured to send or receive data to or from memory 104.

Memory controller 106 is coupled to memory 104 and host 108 and is configured to control memory 104, according to some implementations. Memory controller 106 can manage the data stored in memory 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment solid state disks (SSD) or embedded multi-media-cards (eMMCs) used as data storage for mobile devices, such as smartphones, tablets, laptop computers, etc., and enterprise storage arrays.

Memory controller 106 can be configured to control operations of memory 104, such as read, erase, and program operations. Memory controller 106 can also be configured to manage various functions with respect to the data stored or to be stored in memory 104 including, but not limited to bad-block management, garbage collection, logical-to-physical address conversion, wear leveling, etc. In some implementations, memory controller 106 is further configured to process error correction codes (ECCs) with respect to the data read from or written to memory 104. Any other suitable functions may be performed by memory controller 106 as well, for example, formatting memory 104. Memory controller 106 can communicate with an external device (e.g., host 108) according to a particular communication protocol. For example, memory controller 106 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 2A:
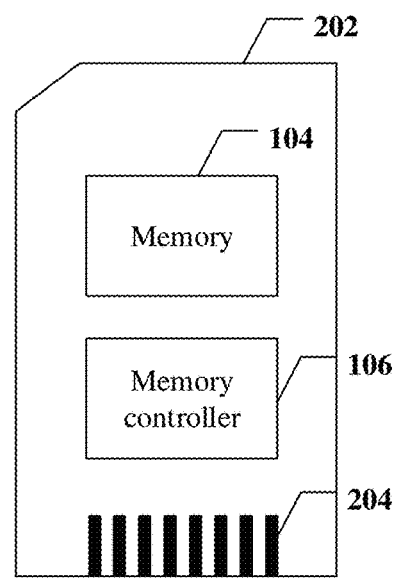
FIG. 2a is a schematic diagram of a memory card with a memory system according to an implementation of the present disclosure.
Figure 2B:
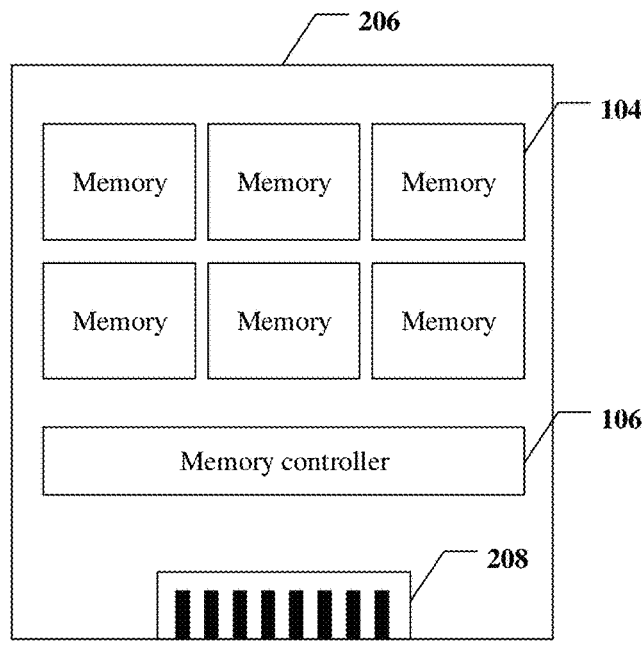
FIG. 2b is a schematic diagram of an solid state drive with a memory system according to an implementation of the present disclosure.

Memory controller 106 and one or more memory 104 can be integrated into various types of storage devices, for example, be included in the same package, such as a universal Flash storage (UFS) package or an eMMC package. That is, memory system 102 can be implemented and packaged into different types of end electronic products. In one example as shown in FIG. 2a, memory controller 106 and a single memory 104 may be integrated into a memory card 202. Memory card 202 can include a PC card (PCM-CIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2b, memory controller 106 and multiple memory 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202.

Figure 3A:
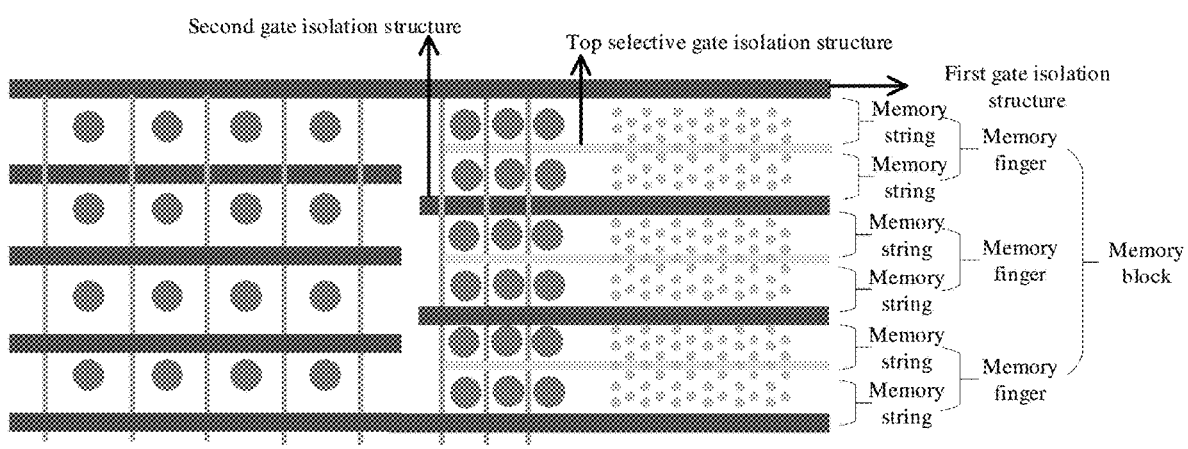
FIG. 3a is a schematic diagram of the distribution of memory cells of a three-dimensional NAND type memory according to an implementation of the present disclosure.

FIG. 3a provides a structural schematic diagram of a memory cell array of a three-dimensional NAND type memory. As shown in FIG. 3a, the memory cell array of a three-dimensional NAND type memory consists of several memory cell rows parallel to gate isolation structure and staggered in parallel. Every two rows of the memory cell rows are separated by a gate isolation structure and a top selective gate isolation structure, and each memory cell row includes a plurality of memory cells. The gate isolation structure may include a first gate isolation structure and a second gate isolation structure. The first gate isolation structure divides the memory cell array into a plurality of memory blocks, the plurality of second gate isolation structures can divide the memory blocks into multiple memory fingers, and the top selective gate isolation structure provided in the middle of each memory finger can divide the memory finger into two parts, so that the memory finger is divided into two memory strings. A memory block shown in FIG. 3a contains 6 memory strings, and in practical applications, the number of memory strings in a memory block is not limited to this.

In some implementations, each memory block can be coupled to multiple word lines, and multiple memory cells coupled to each individually controlled word line form a memory page. By way of example, all memory cells in each memory string in FIG. 3a are coupled to form a memory page.

It should be noted that the number of memory cell rows between the gate isolation structure and the top selective gate isolation structure shown in FIG. 3a is merely one example, and is not used for limiting the number of memory cell rows contained in one memory finger of the three-dimensional NAND type memory in the present disclosure. In practical applications, the number of memory cell rows contained in one memory finger can be adjusted according to actual conditions, such as 2, 4, 8, 16, and so on.

Figure 3B:
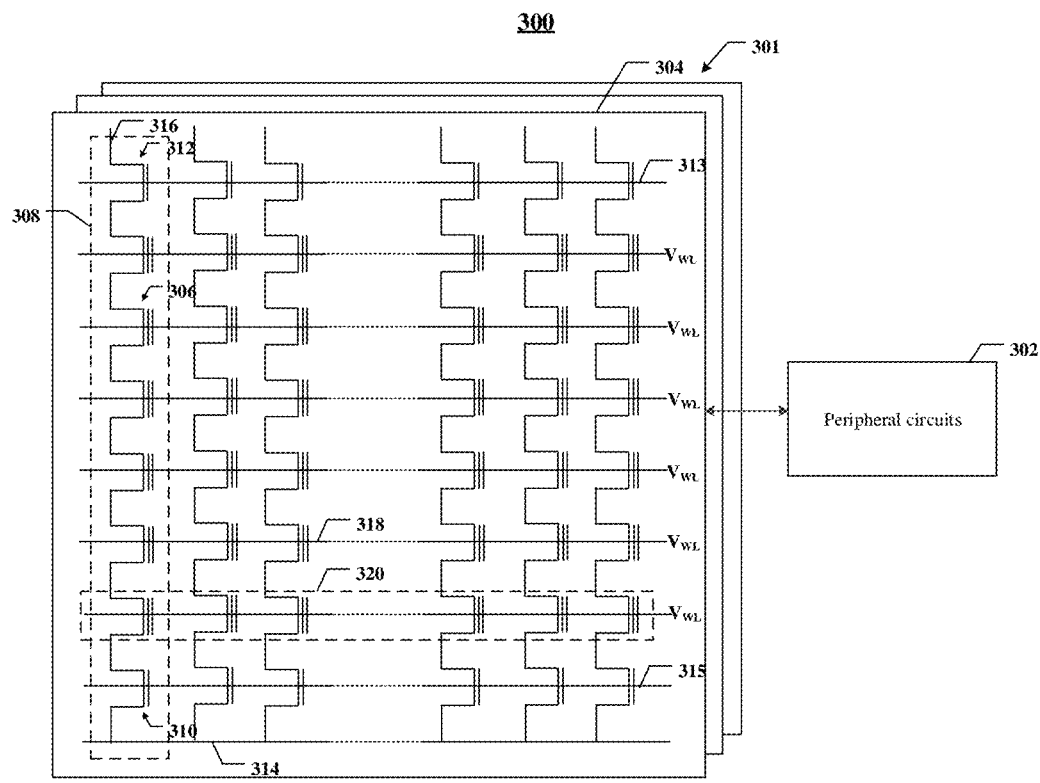
FIG. 3b is a schematic diagram of memory including peripheral circuits according to an implementation of the present disclosure.

FIG. 3b illustrates a schematic circuit diagram of memory 300 including peripheral circuits, according to some aspects of the present disclosure. Memory 300 can be an example of memory 104 in FIG. 1. Memory 300 can include a memory cell array 301 and peripheral circuits 302 coupled to memory cell array 301. The memory cell array 301 is illustrated as an example of a three-dimensional NAND type memory cell array, in which memory cells 306 are provided in the form of an array of NAND memory strings 308 each extending vertically above a substrate (not shown). In some implementations, each NAND memory string 308 includes a plurality of memory cells 306 coupled in series and stacked vertically. Each memory cell 306 can hold a continuous, analog value, such as an electrical voltage or charge, that depends on the number of electrons trapped within a region of memory cell 306. Each memory cell 306 can be either a floating gate type of memory cell including a floating-gate transistor or a charge trap type of memory cell including a charge-trap transistor.

In some implementations, each memory cell 306 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 306 is a Multi-Level Cell (MLC) with four or more memory states. For example, MLC can store two bits per cell, three bits per cell (also known as a Trinary Level Cell (TLC)), or four bits per cell (also known as a Quadruple Level Cell (QLC)). It is to be noted that the memory state mentioned herein is also storage state of the memory cell mentioned in the present disclosure. Different types of memory cells have different numbers of storage states. For example, a SLC-type memory cell has two storage states (that is, two memory states), where the two storage states include: a programmed state, and an erased state. As another example, an MLC-type memory cell has 4 storage states, where the 4 storage states include: an erased state and three programmed states. As yet another example, a TLC-type memory cell has 8 storage states, where the 8 storage states include: an erased state and seven programmed states. In some implementations, a QLC-type memory cell has 16 storage states, where the 16 storage states include: an erased state and fifteen programmed states.

As shown in FIG. 3*b*, each NAND memory string 308 can include a bottom selective gate (BSG) 310 at its source end and a top selective gate (TSG) 312 at its drain end. BSG 310 and TSG 312 can be configured to activate selected NAND memory strings 308 during read and program operations. In some implementations, the sources of NAND memory strings 308 in a same memory block 304 are coupled through a same source line (SL) 314, e.g., a common SL. In other words, all NAND memory strings 308 in the same memory block 304 have an array common source (ACS), according to some implementations. TSG 312 of each NAND memory string 308 is coupled to a respective bit line (BL) 316 from which data can be read or written via an output bus (not shown), according to some implementations. In some implementations, each NAND memory string 308 is configured to be selected or deselected by applying a select voltage (e.g., above the threshold voltage of the transistor having TSG 312) or a deselect voltage (e.g., 0 V) to respective TSG 312 through one or more TSG lines 313 and/or by applying a select voltage (e.g., above the threshold voltage of the transistor having BSG 310) or a deselect voltage (e.g., 0 V) to respective BSG 310 through one or more BSG lines 315.

As shown in FIG. 3*b*, NAND memory strings 308 can be organized into multiple memory blocks 304, each of which can have a common source line 314, e.g., coupled to the ground. In some implementations, each memory block 304 is the basic data unit for erase operations, i.e., all memory cells 306 on the same memory block 304 are erased at the same time. To erase memory cells 306 in a selected memory block 304, source lines 314 coupled to selected memory block 304 as well as unselected memory blocks 304 in the same plane as selected memory block 304 can be biased with an erase voltage (Vers), such as a high positive voltage (e.g., 20 V or more). It is understood that in some examples, erase operation may be performed at a half-memory block level, a quarter-memory block level, or a level having any suitable number of memory blocks or any suitable fractions of a memory block. Memory cells 306 of adjacent NAND memory strings 308 can be coupled through word lines 318 that select which row of memory cells 306 is affected by read and program operations. In some implementations, each word line 318 is coupled to a memory page 320 of memory cells 306, and the memory page 320 is the basic data unit for program operations. The size of one memory 318 in one memory block 304. Each word line 318 can include a plurality of control gates (gate electrodes) at each memory cell 306 in respective memory page 320 and a gate line coupling the control gates. In combination with FIG. 3*a* above, one memory page 320 includes a plurality of memory cells 306, and the plurality of memory cells are isolated by the top selective gate isolation structure and the gate isolation structure. The multiple memory cells between the top selective gate isolation structure and the gate isolation structure are arranged into multiple memory cell rows, and each memory cell row is parallel to the gate isolation structure and the top selective gate isolation structure. Memory cells in memory strings that share a same word line form a programmable (write) memory page.

Figure 3C:
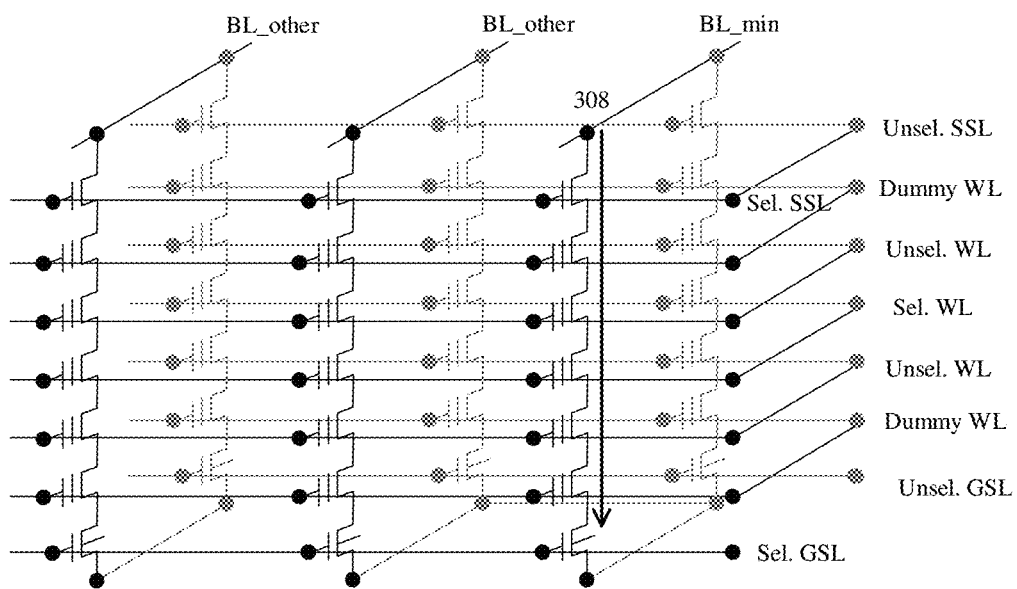
FIG. 3c is a schematic structural diagram of memory strings, word lines, and bit lines in the memory according to another implementation of the present disclosure.

Referring to FIG. 3*a*, FIG. 3*b* and FIG. 3*c*, each memory cell 306 of the plurality of memory cells is coupled to respective word line 318*s*, and each memory string 308 is coupled to respective bit lines 316 via a respective selective transistor (such as top selective transistor (TSG) 312).

Specifically, referring to FIG. 3*c*, the memory can include one or more memory strings 308 (refer to the arrows in FIG. 3*c*), and each memory string can include a top selective transistor SST corresponding to a top selective transistor gate line SSL, a ground selective transistor GST corresponding to a bottom selective transistor gate line GSL and a plurality of memory cells located between the top selective transistor and the ground selective transistor. Each memory string is connected to the respective bit lines BL and the unified common source line respectively.

Here, referring to FIG. 3*c*, the word line coupled to the selected memory page is the selected word line (Sel. WL). The selected word line can be any word line of the multiple word lines in the memory, and other word lines are unselected word lines (Usel.WL) or Dummy Word Lines (Dummy WL). The bit lines BL in the memory are divided into two parts: a part of the bit lines is connected to memory cells that are in the lowest state (that is, the erased state) among the memory cells coupled to the selected word line, denoted as first bit lines (BL_min); and the other part of the bit lines is connected to memory cells other than memory cells that are in the lowest state (that is, the erased state) and have reached a target state among the memory cells coupled to the selected word line, denoted as second bit lines (BL_other). In actual operations, a certain target memory cell of the multiple memory cells can be selected by selecting corresponding word lines and bit lines for performing the corresponding read and program operations.

Figure 4:
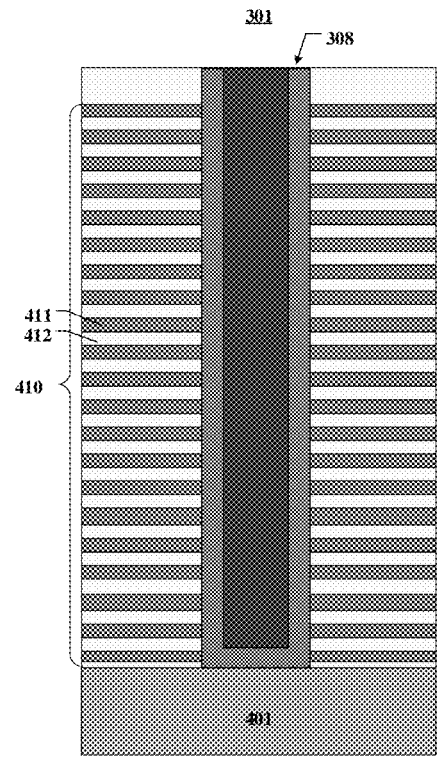
FIG. 4 is a schematic cross-sectional view of a memory cell array including NAND type memory strings according to an implementation of the present disclosure.

FIG. 4 shows a schematic cross-sectional view of a memory cell array 301 including NAND memory strings 308 in accordance with aspects of the present disclosure. As shown in FIG. 4, the NAND memory string 308 may include a stacked structure 410, which includes a plurality of gate layers 411 and a plurality of insulating layers 412 alternately stacked in sequence, and a memory string 308 vertically penetrating through the gate layers 411 and the insulating layers 412. The gate layer 411 and the insulating layer 412 can be stacked alternately, and two adjacent gate layers 411 are separated by an insulating layer 412. The number of pairs of gate layers 411 and insulating layers 412 in the stacked structure 410 can determine the number of memory cells included in the memory cell array 401.

The constituent material of the gate layer 411 may include a conductive material. The conductive material may include but is not limited to tungsten (W), cobalt (Co), Copper (Cu), aluminum (Al), polysilicon, doped silicon, silicide, or any combination thereof. In some implementations, each gate layer 411 may include a metal layer, e.g., a tungsten layer. In some implementations, each gate layer 411 includes a doped polysilicon layer. Each gate layer 411 may include a control gate surrounding the memory cell. The gate layer 411 at the top of the stacked structure 410 may extend laterally as a top selective gate line, the gate layer 411 at the bottom of the stacked structure 410 may extend laterally as a bottom selective gate line, and the gate layer 411 extending laterally between the top selective gate line and the bottom selective gate line may be used as a word line layer.

In some implementations, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable material.

In some implementations, NAND memory string 308 includes a channel structure extending vertically through the stacked structure 410. In some implementations, the channel structure includes a channel hole filled with semiconductor material(s) (e.g., as a semiconductor channel) and dielectric material(s) (e.g., as a memory film). In some implementations, the semiconductor channel includes silicon, e.g., polysilicon. In some implementations, the memory film is a composite dielectric layer including a tunneling layer, a storage layer (also referred to as a "charge trap/storage layer"), and a blocking layer. The channel structure may have a cylindrical shape (e.g., a pillar shape). According to some implementations, the semiconductor channel, the tunneling layer, the storage layer and the blocking layer are radially arranged in this order from the center of the pillar toward the outer surface of the pillar. The tunneling layer may include silicon oxide, silicon oxynitride, or any combination thereof. The storage layer may include silicon nitride, silicon oxynitride, or any combination thereof. The blocking layer may include silicon oxide, silicon oxynitride, a high dielectric constant (high-k) dielectric, or any combination thereof. In one example, the memory film may include a composite layer of silicon oxide/silicon oxynitride/silicon oxide (ONO).

Figure 5:
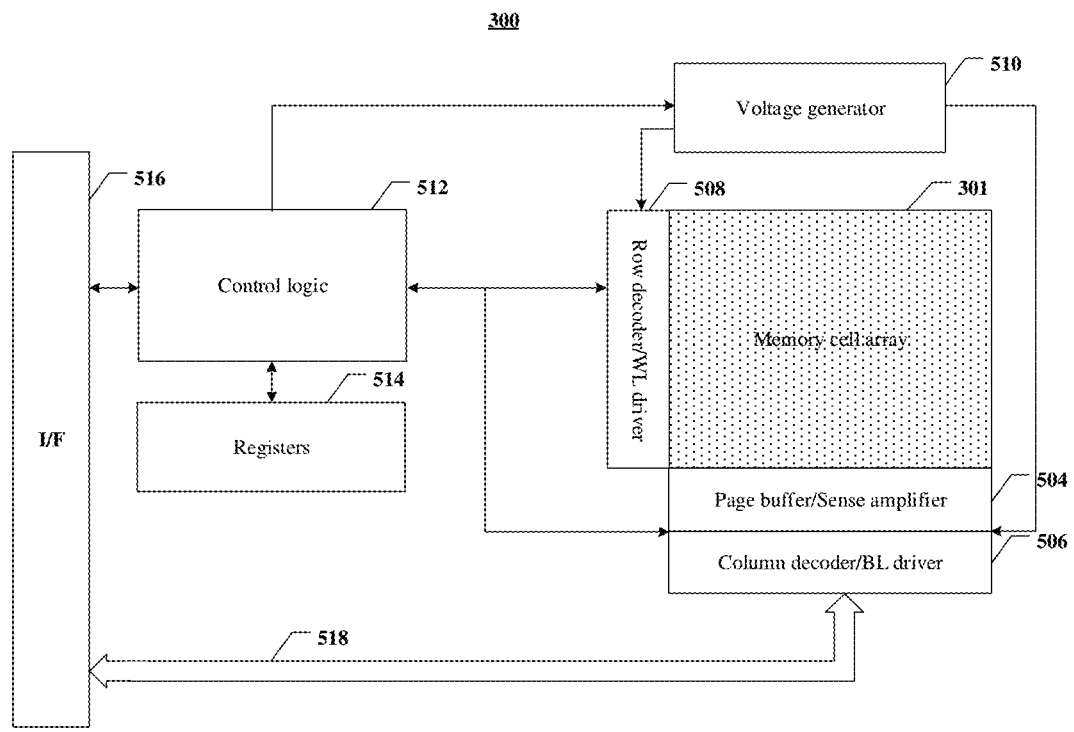
FIG. 5 is a schematic diagram of memory including a memory cell array and peripheral circuits according to an implementation of the present disclosure.

Referring back to FIG. 3b, peripheral circuits 302 can be coupled to memory cell array 301 through bit lines 316, word lines 318, source lines 314, BSG lines 315, and TSG lines 313. Peripheral circuits 302 can include any suitable analog, digital, and mixed-signal circuits for facilitating the operations of memory cell array 301 by applying and sensing voltage signals and/or current signals to and from each target memory cell 306 through bit lines 316, word lines 318, source lines 314, BSG lines 315, and TSG lines 313. Peripheral circuits 302 can include various types of peripheral circuits formed using metal-oxide-semiconductor (MOS) technologies. For example, FIG. 5 illustrates some peripheral circuits, the peripheral circuits 302 including a page buffer/sense amplifier 504, a column decoder/bit line driver 506, a row decoder/word line driver 508, a voltage generator 510, control logic 512, registers 514, an interface 516, and a data bus 518. It is understood that in some examples, additional peripheral circuits not shown in FIG. 5 may be included as well.

Page buffer/sense amplifier 504 can be configured to read and program (write) data from and to memory cell array 301 according to the control signals from control logic 512. In one example, page buffer/sense amplifier 504 may store one page of program data (write data) to be programmed into one memory page 320 of memory cell array 301. In another example, page buffer/sense amplifier 504 may perform program verify operations to ensure that the data has been properly programmed into memory cells 306 coupled to selected word lines 318. In still another example, page buffer/sense amplifier 504 may also sense the low power signals from bit line 316 that represents a data bit stored in memory cell 306 and amplify the small voltage swing to recognizable logic levels in a read operation. Column decoder/bit line driver 506 can be configured to be controlled by control logic 512 and select one or more NAND memory strings 308 by applying bit line voltages generated from voltage generator 510.

Row decoder/word line driver 508 can be configured to be controlled by control logic 512 and select/deselect memory blocks 304 of memory cell array 301 and select/deselect word lines 318 of memory block 304. Row decoder/word line driver 508 can be further configured to drive word lines 318 using word line voltages generated from voltage generator 510. In some implementations, row decoder/word line driver 508 can also select/deselect and drive BSG lines 315 and TSG lines 313 as well. As described below in detail, row decoder/word line driver 508 is configured to perform program operations on the memory cells 306 coupled to the selected word line(s) 318. Voltage generator 510 can be configured to be controlled by control logic 512 and generate the word line voltages (e.g., read voltage, program voltage, pass voltage, channel boost voltage, verification voltage, etc.), bit line voltages, and source line voltages to be supplied to memory cell array 301.

Control logic 512 can be coupled to each peripheral circuit described above and configured to control operations of each peripheral circuit. Registers 514 can be coupled to control logic 512 and include status registers, command registers, and address registers for storing status information, command operation codes (OP codes), and command addresses for controlling the operations of each peripheral circuit. Interface 516 may be coupled to control logic 512 and act as a control buffer to buffer and relay control commands received from a host (not shown) to control logic 512, and to buffer and relay status information received from control logic 512 to the host. Interface 516 may further be coupled to column decoder/bit line driver 506 via data bus 518 and act as a data I/O interface and data buffer to buffer and relay data to or from memory cell array 301.

In a three-dimensional NAND type memory, multiple planes can be read in an async multi-plane independent read mode. It is to be understood that the async multi-plane independent read operation mode can receive and process read commands in parallel without any address or timing constraints. For example, read commands can be directed to any address, for example, different addresses for different memory planes. The read commands can also be received at any time without any specific time sequence. By performing read operations on multiple memory planes in the async multi-plane independent read operation mode at the same time, the read speed of the memory can be improved.

It is to be noted that, during performing a read operation on the NAND type memory in the async multi-plane independent read operation mode, one read operation can be performed on multiple memory planes at the same time. However, in the case of multiple memory planes, only one memory page of each memory plane among the multiple memory planes can be read by one read operation, since the read operation is performed in units of memory page. Therefore, when each memory plane includes multiple memory pages, the data of all memory pages in multiple memory planes can only be obtained when multiple read operations are performed on the memory.

In some implementations, during performing a read operation on the multiple memory planes in the async multi-plane independent read mode, only normal read and random cache read can generally be performed on multiple memory pages in each memory plane, instead of sequential cache read for multiple memory pages in each memory plane. The reason is that when normal read and random cache read are performed in an async multi-plane independent read mode, a read instruction received by the memory includes an address command, and the memory can determine the address of the memory plane to be read and the address of the memory page to be read in the memory plane to be read according to the address command, thus performing reading on the multiple memory planes. However, when sequential cache read is performed in an async multi-plane independent read mode, the read instruction received by the memory does not include the address command. For this reason, the memory cannot determine the address of the memory plane to be read and the address of the memory page to be read, and the read operation cannot be completed.

In some implementations, in order to solve the compatibility problem between the async multi-plane independent read mode and the sequential cache read, an address command is often added into the read instruction received by the memory when the sequential cache read is performed in an async multi-plane independent read mode, so that the memory can obtain the addresses of the memory plane to be read and the memory page to be read after receiving the read instruction, thus performing reading on the multiple memory planes.

Exemplarily, referring to FIGS. 6a and 6b, FIG. 6a is a schematic diagram of level changes such as cache_rbn_pl2, cache_rbn_pl0, cache_rbn_pl1, and cache_rbn_pl3 corresponding to four memory planes (such as a first memory plane plane2, pl2 or PL2, a second memory plane plane0, pl0 or PL0, a third memory plane plane1, pl1 or PL1, and a fourth memory plane plane3, pl3 or PL3) when performing an async multi-plane independent read operation. FIG. 6b is a schematic diagram of an instruction sequence corresponding to the level changes in FIG. 6a. It can be seen from FIG. 6a that the logic circuit (or control circuit) in the memory is active at low level.

Referring to FIGS. 6a and 6b, after receiving a polling command (such as <CMD: 77h>), the memory determines the address of a currently selected memory plane (such as the first memory plane plane2) according to the polling command. After receiving an address command (such as <CMD: 00h>), the memory determines the address of the first memory page to be read (such as PageN) in the currently selected memory plane (such as the first memory plane plane2) according to the address command, that is, determines a starting page (such as PageN) on which read operation is performed in the currently selected memory plane (such as plane2). After receiving a first read command (such as <CMD: 30h>), the memory performs the read operation on the first memory page to be read (such as PageN) in the currently selected memory plane (such as plane2) according to the instruction of the first read command.

Next, the memory can determine the address of another currently selected memory plane (such as the second memory plane plane0) according to the received polling command (such as <CMD: 77h>), and receive the address command (such as <CMD: 00h>) to determine the address of the first memory page to be read (such as PageL) in the another currently selected memory plane (such as plane0), that is, to determine the starting page on which the read operation is performed in the currently selected memory plane (such as plane0). Then, after receiving the first read command (such as <CMD: 30h>), the read operation is performed on the first memory page to be read (such as PageL) in the currently selected memory plane (such as plane0) according to the instruction of the first read command.

Next, the memory can determine the address of yet another currently selected memory plane (such as the third memory plane plane1) according to the received polling command (such as <CMD: 77h>), and receive the address command (such as <CMD: 00h>) to determine the address of the first memory page to be read (such as PageM) in another currently selected memory plane (such as plane1), that is, to determine the starting page on which the read operation is performed in the currently selected memory plane (such as plane1). Then, after receiving the first read command (such as <CMD: 30h>), the read operation is performed on the first memory page to be read (such as PageM) in the currently selected memory plane (such as plane1) according to the instruction of the first read command.

Next, after completing the read operation on the first memory page to be read (such as PageN) in the first memory plane (plane2), a polling command (such as <CMD: 77h>) is received to determine the currently selected memory plane as the first memory plane (plane2). After receiving the address command (such as <CMD: 00h>), the address of a second memory page to be read (such as PageN+1) in the currently selected memory plane (the first memory plane plane2) is determined according to the address command. The second read command (such as <CMD: 31h>) is received, and the read operation is performed on the second memory page to be read (such as PageN+1) in the currently selected memory plane (the first memory plane plane2) according to the instruction of the second read command.

Next, a polling command (such as <CMD: 77h>) is received to determine the second memory plane (plane0) as the currently selected memory plane. The address command (such as <CMD: 00h>) is received to determine the address of the second memory page to be read (PageL+1) in the currently selected memory plane (plane0). The second read command (such as <CMD: 31h>) is received, and read operation is performed on the second memory page to be read (PageL+1) in the currently selected memory plane (the second memory plane plane0) according to the instruction of the second read command.

Next, a polling command (such as <CMD: 77h>) is received to determine the third memory plane (plane1) as the currently selected memory plane. The address command (such as <CMD: 00h>) is received to determine the address of the second memory page to be read (PageM+1) in the currently selected memory plane (plane1). The second read command (such as <CMD: 31h>) is received, and read operation is performed on the second memory page to be read (PageM+1) in the currently selected memory plane (the third memory plane plane1) according to the instruction of the second read command.

Next, a polling command (such as <CMD: 77h>) is received to determine the fourth memory plane (plane3) as the currently selected memory plane. The address command (such as <CMD: 00h>) is received to determine the address of a first memory page to be read (PageK) in the currently selected memory plane (plane3), that is, to determine the starting page on which the read operation is performed in the currently selected memory plane (such as plane3). The first read command (such as <CMD: 30h>) is received, and read operation is performed on the first memory page to be read (such as PageK) in the currently selected memory plane (the fourth memory plane plane3) according to the instruction of the first read command. This is repeated until the data in all the memory pages in the multiple memory planes on which the async multi-plane independent read operation is performed are read, and the read operation ends.

In fact, the above-mentioned process of realizing the compatibility between the async multi-plane independent read mode and the sequential cache read is essentially to read multiple memory pages with consecutive addresses by random cache read commands in an async multi-plane independent read mode. In other words, when reading multiple memory pages with continuous addresses, it is beneficial to add an address command (such as <CMD: 00h>) after the polling command (such as <CMD: 77h>) to determine the address of the memory page to be read. In this way, the read operation becomes cumbersome and complicated, thereby reducing the read performance of the memory.

Figure 7:
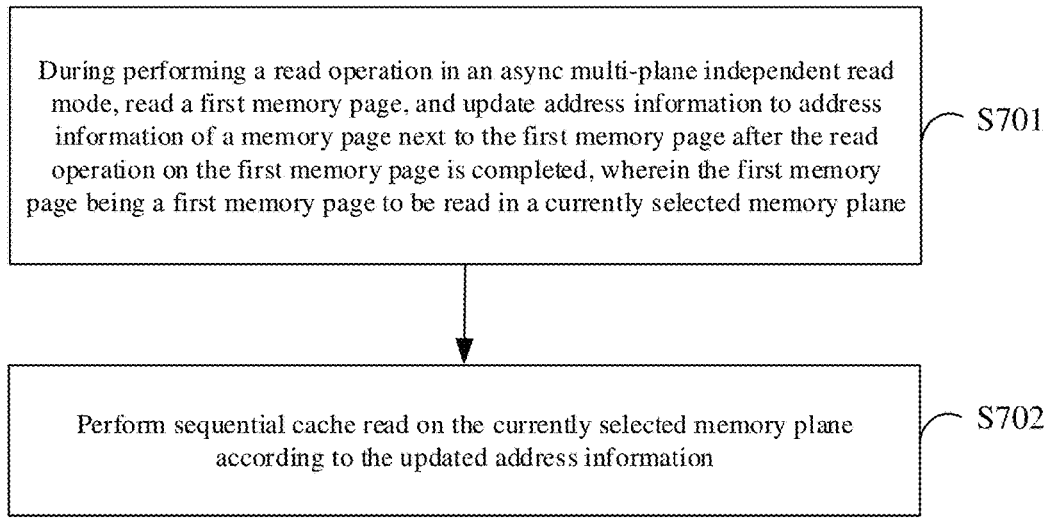
FIG. 7 is a schematic flowchart for implementing an operation method for a memory according to an implementation of the present disclosure.

Based on one or more of the above problems, an implementation of the present disclosure further provides an operation method for a memory, wherein the memory comprises: a memory cell array and a peripheral circuit coupled to the memory cell array, wherein the memory cell array comprises a plurality of memory planes, and each of the memory planes comprises a plurality of memory pages. With reference to FIG. 7, the operation method includes the following operations:

Operation S701: during performing a read operation in an async multi-plane independent read mode, reading a first memory page, and updating address information to address information of a memory page next to the first memory page after the read operation on the first memory page is completed, wherein the first memory page being a first memory page to be read in a currently selected memory plane; and Operation S702: performing sequential cache read on the currently selected memory plane according to the updated address information.

Specifically, the memory may include a memory cell array and peripheral circuits coupled to each other. The memory cell array may include multiple logical units (LUN), each logical unit may include multiple memory planes, each memory plane can include multiple memory blocks, and each memory block can include multiple memory pages. A memory page is the smallest unit for reading and writing (that is, programming) operations, and a memory block is the smallest unit for erasing operations.

The peripheral circuit may include any suitable digital, analog, and/or mixed-signal circuit configured to facilitate various operations of the memory such as reading, writing, and erasing. For example, the peripheral circuit may include control logic (such as a control circuit or controller), a data buffer, a decoder (a decoder may also be referred to as a coder), a driver, and a read and write circuit, etc. When the control logic receives a read and write operation command and address data, the decoder can apply the corresponding voltage from the driver to the corresponding bit lines and word lines based on the decoded address under the action of the control logic to realize the data reading and writing, and data interaction with the outside through the data buffer.

Figure 8A:
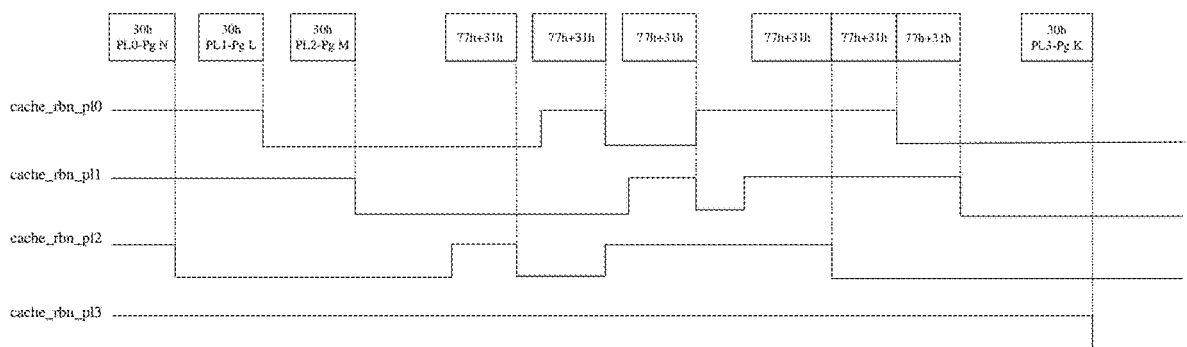
FIG. 8a is a schematic diagram of level changes when a read operation is performed on another memory plane according to an implementation of the present disclosure.

When performing step S701, referring to FIGS. 8*a*, 8*b*, and 9, FIG. 8*a* is schematic diagram of level changes such as cache_rbn_pl0, cache_rbn_pl1, cache_rbn_pl2, and cache_rbn_pl3 corresponding to four memory planes (such as a first memory plane Plane0 or PL0, a second memory plane Plane1 or PL1, a third memory plane Plane2 or PL2, and a fourth memory plane Plane3 or PL3) when performing an read operation. FIG. 8*b* is a schematic diagram of an instruction sequence corresponding to level changes in FIG. 8*a*. It can be seen from FIG. 8*a* that the logic circuit (or control circuit) in the memory is active at a low level. FIG. 9 is a schematic diagram of partial timing when a read operation is performed on the multiple memory planes for performing an async multi-plane independent read operation according to another implementation.

Performing the read operation in the async multi-plane independent read mode includes receiving a first instruction; in response to the first instruction, performing a read operation on a plurality of the currently selected memory planes in the async multi-plane independent read operation mode.

After receiving the read command, the control logic in the peripheral circuit can determine the working mode of the read operation according to the first instruction in the read command. The first instruction here is used to indicate that the working mode of the current read operation is async multi-plane independent read mode (manner), that is, multiple memory planes on which async multi-plane independent read is performed, among multiple memory planes of the memory cell array, are determined from the first instruction. Since the memory cell array includes multiple memory planes, the number of memory planes on which the current read operation is performed is smaller than the number of memory planes in the memory cell array, it is beneficial to determine multiple memory planes on which the async multi-plane independent read operation is performed among multiple memory planes in the memory cell array when the read operation is performed in the async multi-plane independent mode. In some specific implementations, when an async multi-plane independent read operation is performed, multiple memory planes may be read simultaneously, and the number of memory planes may be, for example, 2, 4, 8, and so on. Exemplarily, in the implementation of the present disclosure, with reference to FIGS. 8*a* and 8*b*, performing of an async multi-plane independent read operation is described by taking simultaneous reading of four memory planes as an example.

Based on this, the method further includes receiving a fourth instruction after receiving the first instruction, wherein the fourth instruction including the address information of the currently selected memory plane; and in response to the fourth instruction, determining the address information of the currently selected memory planes of the multiple memory planes.

Referring to FIGS. 8*a* and 8*b* herein, the fourth instruction may be a polling command (such as a 77h command, <CMD: 77h>). Referring to FIG. 10, which is a timing diagram of a 77h command provided in an implementation of the present disclosure, it can be seen from FIG. 10 that the 77h command includes Cycle Type, Status Register, row address information (R1, R2, R3, R4) and the amount of time tWHR to wait after sending the row address and before reading. Here, it can be determined from the fourth instruction (<CMD: 77h>) that the currently selected memory plane is the first memory plane (Plane0 or PL0).

That is, in the implementation of the present disclosure, after determining multiple memory planes on which async multi-plane independent read is performed from multiple memory planes of the memory cell array and obtaining the address of the currently selected memory plane, the address of the first memory page to be read (that is, the first memory page) of the currently selected memory plane is obtained.

Based on above, the method further includes: receiving a fifth instruction after receiving the fourth instruction, wherein the fifth instruction comprising at least address information of the first memory page in the plurality of memory planes on which the async multi-plane independent read operation is performed; and storing address information of a first memory page to be read of each of the plurality of memory planes on which the async multi-plane independent read is performed in the plurality of second registers respectively; and in response to the fifth instruction, determining the address information of the first memory page.

Here, referring to FIGS. 8a and 8b, the fifth instruction may be the 00h command (<CMD: 00h>). The 00h command includes the address of the first memory page to be read in the currently selected memory plane, which may include the row address and column address of the first memory page to be read. Based on this, after receiving the 00h command, the first memory page to be read (i.e., first memory page) in the currently selected memory plane can be determined according to the row address and column address in the 00h command. In other words, the first memory page to be read (i.e., the first memory page PageN) in the currently selected memory plane (the first memory plane Plane0) can be determined from the fifth instruction (<CMD: 00h>).

Next, step S701 is still executed, and the second instruction is received. In response to the second instruction, perform a read operation on the first memory page of each of the plurality of memory planes, and update the address information to the address information of the memory page next to the first memory page after completing the read operation on the first memory page.

Here, referring to FIGS. 8a and 8b, the second instruction may be a 30h command (<CMD: 30h>), and the 30h command can also be referred to as a read command. The memory page of the first memory page in the currently selected memory plane is read according to the instruction of the second instruction (<CMD: 30h>) to obtain the data of the first memory page in the currently selected memory plane (PageN of Plane0). After completing the read operation on the first memory page (PageN), the address information is updated to the address information of the memory page (PageN+1) next to the first memory page.

In some implementations, the peripheral circuit further includes: a first register. The method further includes storing the address information of the currently selected memory plane comprised in the fourth instruction in the first register; and determining the address information of the currently selected memory plane from the first register.

The first register may be an address register, which is used to store the address information of the currently selected memory plane. It is to be noted that the selected memory planes are multiple memory planes on which async multi-plane independent read operations are performed. During performing the read operations, the address information of the multiple memory planes can be obtained or determined from the first register.

In some implementations, the first register may include a plurality of valid data bits. The number of valid data bits is related to the number of the multiple memory planes on which async multi-plane independent read is performed. The more memory planes on which async multi-plane independent read is performed, the more valid data bits in the first register. For example, the number of the plurality of memory planes read in the async multi-plane independent read operation mode is less than or equal to 2N if the number of valid data bits is N. If the number of multiple memory planes on which the async multi-plane independent read is performed is 3, 2 valid data bits are used to represent, such as [2:0]. However, it should be understood that 2 valid data bits (respectively 00, 01, 10, 11) can be used to represent address information of up to four memory planes. Referring to FIG. 9, the first register ampi_cache_rd_pln_sel [2:0] includes 2 valid data bits, and 3 address information are stored in the 2 valid data bits, which are ampi_cache_rd_pln_sel1, ampi_cache_rd_pln_sel2 and ampi_cache_rd_pln_sel3 respectively.

In some implementations, the peripheral circuit further includes: a plurality of second registers. The second registers may be address registers and are used to store the address information of the first memory page to be read of each of the multiple memory planes of the memory cell array Each of the plurality of memory planes used to store the memory cell array. One second register is used to store the address information of the first memory page to be read of one memory plane.

Next, the memory can determine the address of another currently selected memory plane (that is, the second memory plane plane1) according to the received fourth instruction (such as <CMD: 77h>), and receive the fifth instruction (such as <CMD: 00h>) to determine the address of the first memory page to be read (the first memory page, PageL) in the another currently selected memory plane (plane1), that is, to determine a starting page on which the read operation is performed in the currently selected memory plane (plane1). Then, after receiving the second instruction (<CMD: 30h>), a read operation is performed on the first memory page to be read (the first memory page, PageL) in the currently selected memory plane (plane1) according to the instruction of the second instruction. After completing the read operation on the first memory page (PageL), the address information is updated to the address information of the memory page (PageL+1) next to the first memory page.

Next, the memory can determine the address of yet another currently selected memory plane (that is, the third memory plane plane2) according to the received fourth instruction (<CMD: 77h>), and receive the fifth instruction (such as <CMD: 00h>), to determine the address of the first memory page to be read (the first memory page, PageM) in another currently selected memory plane (plane2), that is, to determine the starting page on which the read operation is performed in the currently selected memory plane (plane2). Then, after receiving the second instruction (<CMD: 30h>), a read operation is performed on the first memory page to be read (the first memory page, PageM) in the currently selected memory plane (plane2) according to the instructions of the second instruction. After completing the read operation on the first memory page (PageM), the address information is updated to the address information of the memory page (PageM+1) next to the first memory page.

To understand more clearly that, as mentioned in the foregoing implementations, the address information is updated to the address information of the memory page next to the first memory page after the read operation on the first memory page is completed, descriptions will be given below in conjunction with FIGS. 8a, 8b and 9 in detail.

In some implementations, updating the address information to the address information of the memory page next to the first memory page after completing the read operation on the first memory page comprises: receiving the third instruction after determining the currently selected memory plane, and triggering a first signal in response to the third instruction. The first signal indicates that the address information in the second register corresponding to the currently selected memory plane is to be updated to the address information of the memory page next to the first memory page.

Referring to FIGS. 8*a*, 8*b* and 9, the third instruction may be a 31h command (<CMD: 31h>), which may also be referred to as a sequential cache read command. The first signal ampi_seq_cache_rd_det is triggered in response to the 31h command. The first signal ampi_seq_cache_rd_det indicates to update the address information in the second register corresponding to the first memory page to the address information of the memory page next to the first memory page. Next, in response to the third instruction, and according to the updated address information, sequential cache read is performed on other memory pages in the multiple currently selected memory planes. It is noted that, before performing read operations on other memory pages of the currently selected memory plane (that is, receiving the third instruction), it is beneficial to receive the fourth instruction (<CMD: 77h>) again, and the currently selected memory plane among multiple memory planes is re-determined from the fourth instruction (<CMD: 77h>).

Specifically, referring to FIGS. 8*a* and 8*b*, it is determined that the currently selected memory plane is the first memory plane (Plane0) from the fourth instruction (<CMD: 77h>). The read operation is performed on the memory page (that is, the second memory page, PageN+1) next to the first memory page in the currently selected first memory plane according to the third instruction (<CMD: 31h>) and the first signal triggered by the third instruction. After the read operation on the second memory page (PageN+1) is completed, the address information is updated to the address information of the memory page (PageN+2) next to the second memory page.

Next, the currently selected memory plane is determined as the second memory plane (Plane1) according to the fourth instruction (<CMD: 77h>). The read operation is performed on the memory page (that is, the second memory page, PageL+1) next to the first memory page in the currently selected second memory plane according to the third instruction (<CMD: 31h>) and the first signal triggered by the third instruction. After the read operation on the second memory page (PageL+1) is completed, the address information is updated to address information of the memory page (PageL+2) next to the second memory page.

Next, the currently selected memory plane is determined as the third memory plane (Plane2) according to the fourth instruction (<CMD: 77h>). The read operation is performed on the memory page (that is, the second memory page, PageM+1) next to the first memory page in the currently selected third memory plane according to the third instruction (<CMD: 31h>) and the first signal triggered by the third instruction. After the read operation on the second memory page (PageM+1) is completed, the address information is updated to the address information of the memory page (PageM+2) next to the second memory page.

Next, the currently selected memory plane is determined as the fourth memory plane (Plane3) according to the fourth instruction (<CMD: 77h>) received. According to the received fifth instruction (<CMD: 00h>) and the second instruction (<CMD: 30h>), the currently selected memory page is determined as the first memory page to be read (PageK) in the fourth memory plane, and a read operation is performed on the currently selected memory page (PageK). In this way, the first signal can be triggered based on the third instruction, so that after the read operation on the current memory page is completed, the address information is updated to the address information of the memory page next to the current memory page. That is, among multiple memory planes that can be read in the async multi-plane independent read mode in the present application, the addresses of multiple memory pages to be read in the memory plane can be self-incremented, thus avoiding the use of the fifth instruction (<CMD: 00h>) to determine the address of the memory page next to the first memory page, which enables the compatibility between the async multi-plane independent read mode and the sequential cache read, thereby improving the reading performance of the memory.

To further understand the concept of this solution, referring to FIG. 9, which is a schematic diagram of part of the process of sequential cache read that is separately performed on multiple memory pages in three memory planes (such as pln1, pln2 and pln3) in the async multi-plane independent read operation mode according to another implementation. The fourth instruction (<CMD: 77h>) is received via data bus DQ [7:0] shown in FIG. 9, and pln1 is determined as the currently selected memory plane from the fourth instruction (<CMD: 77h>). The third instruction (<CMD: 31h>) is received, and the first signal ampi_seq_cache_rd_det (point A in FIG. 9) is triggered to update the address information of PageL in ampi_pln1_addr to the address information of PageL+1.

Next, the fourth instruction (<CMD: 77h>) is received, and pln2 is determined as the currently selected memory plane from the fourth instruction (<CMD: 77h>). The third instruction (<CMD: 31h>) is received, and the first signal ampi_seq_cache_rd_det (point B in FIG. 9) is triggered to update the address information of PageM in ampi_pln2_addr to the address information of PageM+1.

Next, the fourth instruction (<CMD: 77h>) is received, pln3 is determined as the currently selected memory plane from the fourth instruction (<CMD: 77h>). The fifth instruction (<CMD: 00h>) is received, and PageK in pln3 is determined as the currently selected memory page from the fifth instruction (<CMD: 00h>). The third instruction (<CMD: 31h>) is received, and a read operation is performed on PageK shown in ampi_pln3_addr according to the third instruction (<CMD: 31h>). It is noted that, in some other implementations, after determining that PageK in pln3 is the first memory page to be read in the currently selected memory plane from the fifth instruction (<CMD: 00h>), the second instruction (<CMD: 30h>) can be received, and a read operation is performed on PageK according to the second instruction (<CMD: 30h>).

In some implementations, the peripheral circuit further includes: a third register ampi_seq_cache_read_en. The third register ampi_seq_cache_read_en is used to store a value representing the state of the memory. The method further includes: after receiving the first instruction and the second instruction, obtaining a value stored in the third register; wherein when the value stored in the third register is a first value, responding to the first instruction, the second instruction and the third instruction; and when the value stored in the third register is a second value, not responding to the first instruction, the second instruction and the third instruction.

Exemplarily, the third register ampi_seq_cache_read_en may be a switch register for storing a value indicating that the memory is on or off. When the value stored in the third register is the first value, and if the first value indicates that the state of the memory is on, it is indicated that the memory is currently in a working state, and at this time, the memory can respond to the first instruction, the second instruction, the third instruction, the fourth instruction and the fifth instruction mentioned in the above-mentioned implementations. When the value stored in the third register is the second value indicates that the state of the memory is off, it is indicated that the memory is currently in a non-working state, and at this time, the memory dost not respond to the first instruction, the second instruction, the third instruction, the fourth instruction and the fifth instruction mentioned in the above-mentioned implementations.

Based on above, in the implementation of the present disclosure, after performing a read operation on the first memory page to be read in the currently selected memory plane, the address information of the first memory page to be read is updated to address information of the memory page next to the first memory page to be read, so as to realize the sequential update of the address information of the multiple memory pages of each of the multiple memory planes, which also solves the problem of incompatibility between async multi-plane independent read mode and sequential cache read, thereby improving the reading performance of the memory.

On the other hand, an implementation of the present disclosure provides a memory, comprises: a memory cell array and a peripheral circuit coupled to the memory cell array, wherein the memory cell array comprises a plurality of memory planes, and each of the memory planes comprises a plurality of memory pages; and the peripheral circuit is configured to: during performing a read operation in an async multi-plane independent read mode, read a first memory page, and update address information to address information of a memory page next to the first memory page after the read operation on the first memory page is completed, wherein the first memory page being a first memory page to be read in a currently selected memory plane; and perform sequential cache read on the currently selected memory plane according to the updated address information.

In some implementations, the peripheral circuit is further configured to: receive a first instruction before performing the read operation; in response to the first instruction, perform a read operation on a plurality of the currently selected memory planes in the async multi-plane independent read operation mode; receive a second instruction; in response to the second instruction, perform a read operation on the first memory page of each of the plurality of memory planes, and update the address information to the address information of the memory page next to the first memory page after completing the read operation on the first memory page; and receive a third instruction; in response to the third instruction, perform the sequential cache read on the plurality of the currently selected memory planes according to the updated address information.

In some implementations, the peripheral circuit is further configured to: receive a fourth instruction after receiving the first instruction and before receiving the second instruction and after receiving the second instruction and before receiving the third instruction, wherein the fourth instruction comprising address information of the currently selected memory plane; and in response to the fourth instruction, determine the address information of the currently selected memory plane among the plurality of memory planes.

In some implementations, the peripheral circuit further includes: a first register; the peripheral circuit is configured to: store the address information of the currently selected memory plane comprised in the fourth instruction in the first register; and determine the address information of the currently selected memory plane from the first register.

In some implementations, the peripheral circuit further includes: a plurality of second registers; the peripheral circuit is configured to: receive a fifth instruction after receiving the fourth instruction and before receiving the second instruction, wherein the fifth instruction comprising at least address information of the first memory page in the plurality of memory planes on which the async multi-plane independent read operation is performed; store address information of a first memory page to be read of each of the plurality of memory planes on which the async multi-plane independent read is performed in the plurality of second registers respectively; and in response to the fifth instruction, determine the address information of the first memory page.

In some implementations, the peripheral circuit is further configured to: receive the third instruction after determining the currently selected memory plane, and trigger a first signal in response to the third instruction, wherein the first signal indicating that the address information in the second register corresponding to the currently selected memory plane is to be updated to the address information of the memory page next to the first memory page.

In some implementations, the first register comprises a plurality of valid data bits; wherein the number of the plurality of memory planes read in the async multi-plane independent read operation mode is less than or equal to $2^N$ if the number of valid data bits is N.

In some implementations, the peripheral circuit further comprises: a third register; when a value stored in the third register is a first value, the peripheral circuit responds to the first instruction, the second instruction and the third instruction; and when the value stored in the third register is a second value, the peripheral circuit does not respond to the first instruction, the second instruction and the third instruction.

In some implementations, the memory comprises a NAND type memory.

In yet another aspect, an implementation of the present disclosure provides a memory system, comprises: one or more memories as described in the above-mentioned implementations of the present disclosure; and a memory controller coupled to the memories and configured to control the memories.

In some implementations, the memory system includes a universal flash storage UFS device or a solid-state hard disk.

It should be understood that reference throughout the specification to "one implementation" or "an implementation" means that a particular feature, structure or characteristic related to the implementation is included in at least one implementation of the present disclosure. Thus, appearances of "in one implementation" or "in an implementation" in various places throughout the specification are not necessarily referring to the same implementation. Furthermore, these particular features, structures or characteristics may be combined in any suitable manner in one or more implementations. It should be understood that in various implementations of the present disclosure, the sequence numbers of the above-mentioned processes do not mean the order of execution, and the execution order of the processes should be determined by their functions and inherent logic, rather than limiting implementation process of the implementations of the present disclosure. The serial numbers of the above-mentioned implementations of the present disclosure are for description only, and do not represent the advantages and disadvantages of the implementations.

The methods disclosed in the several method implementations provided in the present disclosure can be combined arbitrarily to obtain new method implementations if there is no conflict.

The forgoing description is only a specific implementation of the present disclosure, but the protection scope of the present disclosure is not limited thereto. Anyone skilled in the art can easily conceive of changes or substitutions within the technical scope of the present disclosure, which should fall within the protection scope of the present disclosure. Therefore, the protection scope of the present disclosure should be determined by the protection scope of the claims.

What is claimed is:

1. A memory, comprising:
a memory cell array comprising a plurality of memory planes, each of the plurality of memory planes comprising a plurality of memory pages; and
a peripheral circuit coupled to the memory cell array and configured to:
in response to a read operation instruction, during performing read operations in an async multi-plane independent read operation mode, read a first memory page in each of a plurality of currently selected memory planes, and update address information to address information of a memory page next to the first memory page in each of the plurality of currently selected memory planes after the read operation on the first memory page in each of the plurality of currently selected memory planes is completed, the first memory page being a first memory page to be read in each of the plurality of currently selected memory planes; and
in response to a sequential cache read instruction, perform sequential cache read on the plurality of currently selected memory planes according to the updated address information.

2. The memory of claim 1, wherein the peripheral circuit is further configured to:
receive a first instruction before performing the read operations;
in response to the first instruction, perform a read operation on the plurality of the currently selected memory planes in the async multi-plane independent read operation mode;
receive the read operation instruction, the read operation instruction being a second instruction; and
receive the sequential cache read instruction, the sequential cache read instruction being a third instruction.

3. The memory of claim 2, wherein the peripheral circuit is further configured to:
receive a fourth instruction after receiving the first instruction and before receiving the second instruction, and after receiving the second instruction and before receiving the third instruction, the fourth instruction including address information of the plurality of currently selected memory planes; and
in response to the fourth instruction, determine the address information of the plurality of currently selected memory planes among the plurality of memory planes.

4. The memory of claim 3, wherein:
the peripheral circuit further comprises a first register, and
the peripheral circuit is further configured to:
store the address information of the plurality of currently selected memory planes comprised in the fourth instruction in the first register; and
determine the address information of the plurality of currently selected memory planes from the first register.

5. The memory of claim 4, wherein:
the peripheral circuit further comprises a plurality of second registers;
the peripheral circuit is configured to:
receive a fifth instruction after receiving the fourth instruction and before receiving the second instruction, the fifth instruction including at least address information of the first memory page in each of the plurality of currently selected memory planes on which the async multi-plane independent read operation is performed;
store address information of the first memory page to be read of each of the plurality of currently selected memory planes on which the async multi-plane independent read operation is performed in the plurality of second registers respectively; and
in response to the fifth instruction, determine the address information of the first memory page.

6. The memory of claim 5, wherein the peripheral circuit is further configured to:
receive the third instruction after determining the plurality of currently selected memory planes; and
trigger a first signal in response to the third instruction, the first signal indicating that the address information in the second register corresponding to the plurality of currently selected memory planes is to be updated to the address information of the memory page next to the first memory page.

7. The memory of claim 4, wherein:
the first register comprises a plurality of valid data bits N, where N is a positive integer, and
a number of the plurality of currently selected memory planes read in the async multi-plane independent read operation mode is less than or equal to $2^N$.

8. The memory of claim 2, wherein:
the peripheral circuit further comprises a third register,
when a value stored in the third register is a first value, the peripheral circuit is configured to responds to the first instruction, the second instruction and the third instruction; and
when the value stored in the third register is a second value, the peripheral circuit is configured to not respond to the first instruction, the second instruction and the third instruction.

9. The memory of claim 1, wherein the memory comprises a NAND type memory.

10. A memory system, comprising:
a memory, comprising:
a memory cell array comprising a plurality of memory planes, each of the plurality of memory planes including a plurality of memory pages; and
a peripheral circuit coupled to the memory cell array and configured to:
in response to a read operation instruction, during performing read operations in an async multi-plane independent read operation mode, read a first memory page in each of a plurality of currently selected memory planes, and update address information to address information of a memory page next to the first memory page in each of the plurality of currently selected memory planes after the read operation on the first memory page in each of the plurality of currently selected memory planes is completed, the first memory page being a first memory page to be read in each of the plurality of currently selected memory planes; and
in response to a sequential cache read instruction, perform sequential cache read on the plurality of currently selected memory planes according to the updated address information; and
a memory controller coupled to the memory and configured to control the memory.

11. The memory system of claim 10, wherein the peripheral circuit is further configured to:
receive a first instruction before performing the read operations;

in response to the first instruction, perform a read operation on the plurality of the currently selected memory planes in the async multi-plane independent read operation mode;

receive the read operation instruction, the read operation instruction being a second instruction; and receive the sequential cache read instruction, the sequential cache read instruction being a third instruction.

12. The memory system of claim 10, wherein the memory system comprises a solid-state drive.

13. A method of operating a memory, comprising:

in response to a read operation instruction, during performing read operations in an async multi-plane independent read operation mode, reading, by a peripheral circuit, a first memory page from each of a plurality of currently selected memory planes of a memory cell array, and updating address information to address information of a memory page next to the first memory page in each of the plurality of currently selected memory planes after the read operation on the first memory page in each of the plurality of currently selected memory planes is completed, wherein the first memory page being a first memory page to be read in each of the plurality of currently selected memory planes; and in response to a sequential cache read instruction, performing, by the peripheral circuit, sequential cache read on the plurality of currently selected memory planes according to the updated address information.

14. The method of claim 13, wherein the performing, by the peripheral circuit, the read operations in the async multi-plane independent read operation mode comprises:

receiving a first instruction;

in response to the first instruction, performing a read operation on the plurality of the currently selected memory planes in the async multi-plane independent read operation mode; and reading the first memory page, and updating the address information to the address information of the memory page next to the first memory page in each of the plurality of currently selected memory planes after the read operation on the first memory page in each of the plurality of currently selected memory planes after is completed;

receiving the read operation instruction, the read operation instruction being a second instruction; and receiving the sequential cache read instruction, the sequential cache read instruction being a third instruction.

15. The method of claim 14, further comprising:

receiving, by the peripheral circuit, a fourth instruction after receiving the first instruction and before receiving the second instruction and after receiving the second instruction and before receiving the third instruction, the fourth instruction including address information of the plurality of currently selected memory planes; and in response to the fourth instruction, determining, by the peripheral circuit, the address information of the plurality of currently selected memory planes among a plurality of memory planes.

16. The method of claim 15, further comprising:

storing, by the peripheral circuit, the address information of the plurality of currently selected memory planes comprised in the fourth instruction in a first register; and determining, by the peripheral circuit, the address information of the plurality of currently selected memory planes from the first register.

17. The method of claim 16, further comprising:

receiving, by the peripheral circuit, a fifth instruction after receiving the fourth instruction and before receiving the second instruction, wherein the fifth instruction comprising at least address information of the first memory page in the plurality of currently selected memory planes on which the async multi-plane independent read operation is performed;

storing, by the peripheral circuit, address information of a first memory page to be read of each of the plurality of currently selected memory planes on which the async multi-plane independent read operation is performed in a plurality of second registers respectively; and in response to the fifth instruction, determining, by the peripheral circuit, the address information of the first memory page.

18. The method of claim 17, wherein the updating, by the peripheral circuit, the address information to the address information of the memory page next to the first memory page after completing the read operation on the first memory page comprises:

receiving the third instruction after determining the plurality of currently selected memory planes, and triggering a first signal in response to the third instruction, wherein the first signal indicating that the address information in the second register corresponding to the plurality of currently selected memory planes is to be updated to the address information of the memory page next to the first memory page.

19. The method of claim 16, wherein:

the first register comprises a plurality of valid data bits, and a number of the plurality of currently selected memory planes read in the async multi-plane independent read operation mode is less than or equal to $2^N$ if the number of valid data bits is N.

20. The method of claim 14, further comprising:

obtaining, by the peripheral circuit, a value stored in a third register after receiving the first instruction and the second instruction;

when the value stored in the third register is a first value, responding, by the peripheral circuit, to the first instruction, the second instruction and the third instruction; and when the value stored in the third register is a second value, not responding, by the peripheral circuit, to the first instruction, the second instruction, and the third instruction.

\* \* \* \* \*